(12) United States Patent
Basir et al.

(10) Patent No.: US 9,756,163 B2
(45) Date of Patent: Sep. 5, 2017

(54) INTERFACE BETWEEN MOBILE DEVICE AND COMPUTING DEVICE

(75) Inventors: Otman A. Basir, Guelph (CA);
William Ben Miners, Guelph (CA);
Yong He, Waterloo (CA); Eric Gordon Hartwell, Waterloo (CA)

(73) Assignee: INTELLIGENT MECHATRONIC SYSTEMS, INC. (CA)

( * ) Notice: Subject to any disclaimer, the term of this patent is extended or adjusted under 35 U.S.C. 154(b) by 818 days.

(21) Appl. No.: 13/206,199

(22) Filed: Aug. 9, 2011

(65) Prior Publication Data

US 2012/0036441 A1 Feb. 9, 2012

Related U.S. Application Data

(60) Provisional application No. 61/371,777, filed on Aug. 9, 2010.

(51) Int. Cl.
| | |
|---|---|
| *G06F 15/177* | (2006.01) |
| *H04M 1/64* | (2006.01) |
| *G06F 3/0481* | (2013.01) |
| *G06F 3/0482* | (2013.01) |
| *H04W 4/00* | (2009.01) |
| *H04L 29/08* | (2006.01) |
| *H04M 1/60* | (2006.01) |
| *H04M 1/725* | (2006.01) |

(52) U.S. Cl.
CPC .......... *H04M 1/642* (2013.01); *G06F 3/0481* (2013.01); *G06F 3/0482* (2013.01); *H04L 67/04* (2013.01); *H04L 67/10* (2013.01); *H04M 1/72552* (2013.01); *H04W 4/008* (2013.01); *H04M 1/6075* (2013.01); *H04M 1/7253* (2013.01); *H04M 2250/60* (2013.01)

(58) Field of Classification Search
CPC ............. H04M 1/642; H04M 1/72552; H04M 1/6075; H04M 1/7253; H04M 2250/60; H04W 4/008; H04L 67/04; H04L 67/10; G06F 3/0481; G06F 3/0482
USPC .................. 715/734; 455/552.1, 412.1, 41.2; 704/260, 206
See application file for complete search history.

(56) References Cited

U.S. PATENT DOCUMENTS

| | | | |
|---|---|---|---|
| 6,690,268 | B2 | 2/2004 | Schofield et al. |
| 6,697,638 | B1 | 2/2004 | Larsson et al. |
| 6,714,223 | B2 | 3/2004 | Asami et al. |
| 6,812,888 | B2 | 11/2004 | Drury et al. |
| 6,895,310 | B1 | 5/2005 | Kolls |
| 6,944,679 | B2 | 9/2005 | Parupudi et al. |
| 6,968,272 | B2 | 11/2005 | Knockeart et al. |

(Continued)

FOREIGN PATENT DOCUMENTS

| | | |
|---|---|---|
| EP | 1802055 | 6/2007 |
| EP | 1829339 | 9/2007 |

OTHER PUBLICATIONS

International Search Report for PCT Application No. PCT/CA2011/000909, Nov. 18, 2011.

*Primary Examiner* — Kieu Vu
*Assistant Examiner* — Asteway T Gattew
(74) *Attorney, Agent, or Firm* — Carlson, Gaskey & Olds, P.C.

(57) ABSTRACT

An interface between mobile devices and computing devices, such as a PC or an in-vehicle system permits a user to use the better user interface of the computing device to access and control the operation of the mobile device.

15 Claims, 5 Drawing Sheets

(56) References Cited

U.S. PATENT DOCUMENTS

| | | |
|---|---|---|
| 6,970,703 B2 | 11/2005 | Fuchs et al. |
| 6,970,783 B2 | 11/2005 | Knockeart et al. |
| 7,050,834 B2 | 5/2006 | Harwood et al. |
| 7,113,911 B2 | 9/2006 | Hinde et al. |
| 7,228,224 B1 | 6/2007 | Rosen et al. |
| 7,286,857 B1 | 10/2007 | Walker et al. |
| 7,289,796 B2 | 10/2007 | Kudoh |
| 7,296,066 B2 | 11/2007 | Lehaff et al. |
| 7,346,374 B2 | 3/2008 | Witkowski et al. |
| 7,366,795 B2 | 4/2008 | O'Neil et al. |
| 7,400,879 B2 | 7/2008 | Lehaff et al. |
| 7,689,253 B2 | 3/2010 | Basir |
| 7,693,720 B2 | 4/2010 | Kennewick et al. |
| 8,015,010 B2 | 9/2011 | Basir |
| 9,525,567 B2 | 12/2016 | Basir et al. |
| 2001/0005864 A1 | 6/2001 | Mousseau et al. |
| 2002/0032042 A1 | 3/2002 | Poplawsky et al. |
| 2004/0090950 A1 | 5/2004 | Lauber et al. |
| 2004/0145457 A1 | 7/2004 | Schofield et al. |
| 2004/0193420 A1 | 9/2004 | Kennewick et al. |
| 2005/0046584 A1 | 3/2005 | Breed |
| 2005/0054386 A1 | 3/2005 | Chung |
| 2005/0130631 A1 | 6/2005 | Maguire et al. |
| 2005/0143134 A1 | 6/2005 | Harwood et al. |
| 2006/0030298 A1 | 2/2006 | Burton et al. |
| 2006/0052921 A1 | 3/2006 | Bodin et al. |
| 2006/0089754 A1 | 4/2006 | Mortenson |
| 2007/0143421 A1 | 6/2007 | Vuong et al. |
| 2008/0305742 A1* | 12/2008 | Basir ............................ 455/41.2 |
| 2009/0061912 A1 | 3/2009 | Brown et al. |
| 2009/0221321 A1* | 9/2009 | Fields et al. ............... 455/552.1 |
| 2009/0248823 A1 | 10/2009 | Li et al. |
| 2009/0276701 A1* | 11/2009 | Nurmi ........................... 715/702 |
| 2010/0137037 A1 | 6/2010 | Basir |
| 2010/0169432 A1 | 7/2010 | Santori, Jr. et al. |
| 2011/0121991 A1 | 5/2011 | Basir |

* cited by examiner

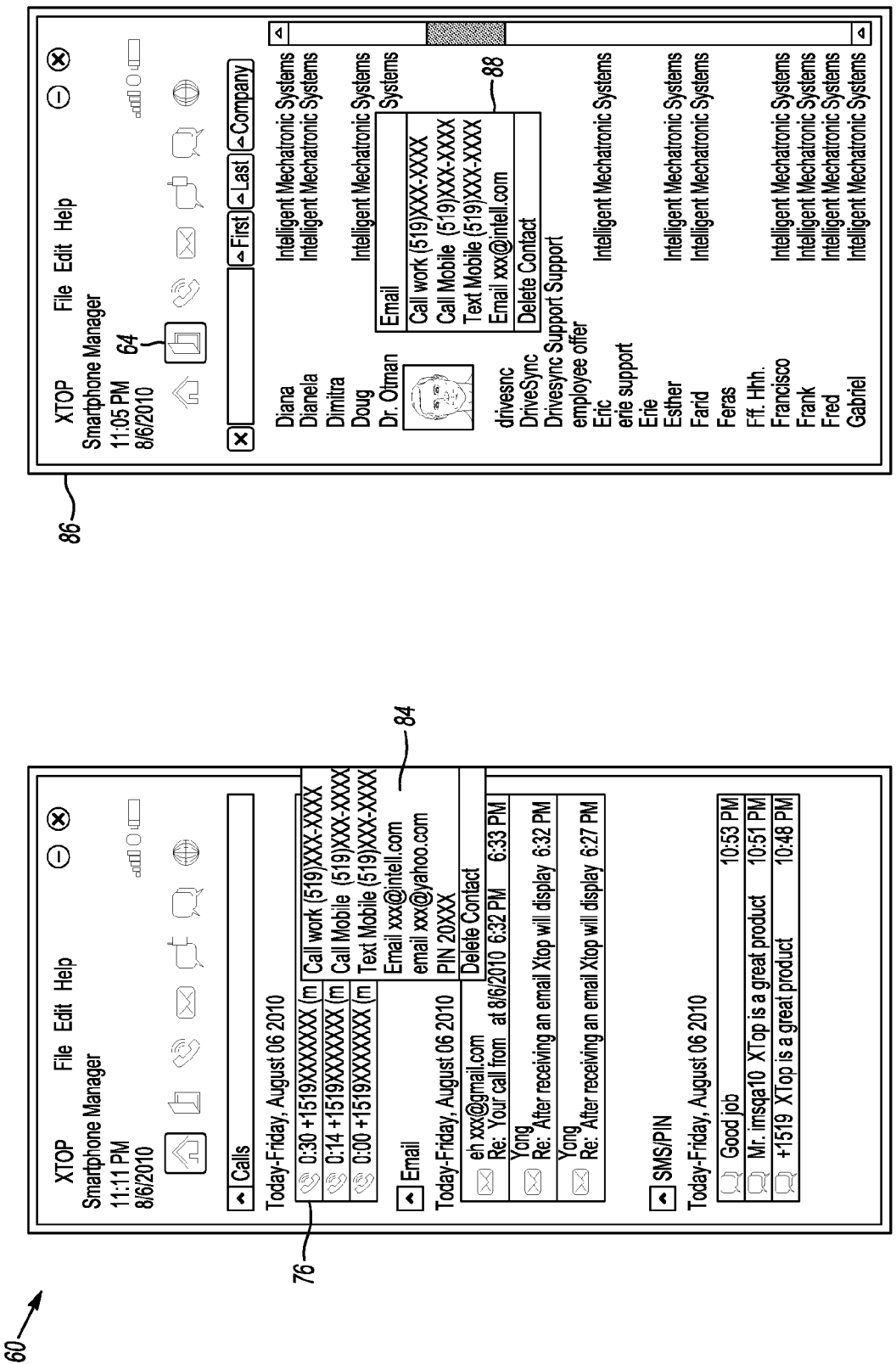

INTERFACE BETWEEN MOBILE DEVICE AND COMPUTING DEVICE

This application claims priority to U.S. Provisional Application Ser. No. 61/371,777 filed Aug. 9, 2010.

BACKGROUND

Mobile email/contact/calendar devices, such as "smartphones," wireless-enabled mobile devices, etc., (collectively referred to as "mobile devices") are a convenient way for people to stay connected when traveling, in meetings and on the road. Email, contacts and calendar entries are cached on the mobile device and synced with a server via a wireless connection. Users can send and receive email, update contacts and add or changes calendar appointments, which updates are stored on the server. However, mobile devices have several limitations. The limited keyboard and display make it difficult to compose large emails or other documents.

SUMMARY

The present invention provides an interface between mobile devices and computing devices, such as a PC or an in-vehicle system. The interface permits a user to use the better user interface of the computing device to access and control the operation of the mobile device.

BRIEF DESCRIPTION OF THE DRAWINGS

FIG. 6 shows the screen of FIG. 5 with a phone right-click menu.

FIG. 7 shows a contact screen and right-click menu.

DESCRIPTION OF A PREFERRED EMBODIMENT

Figure 1:
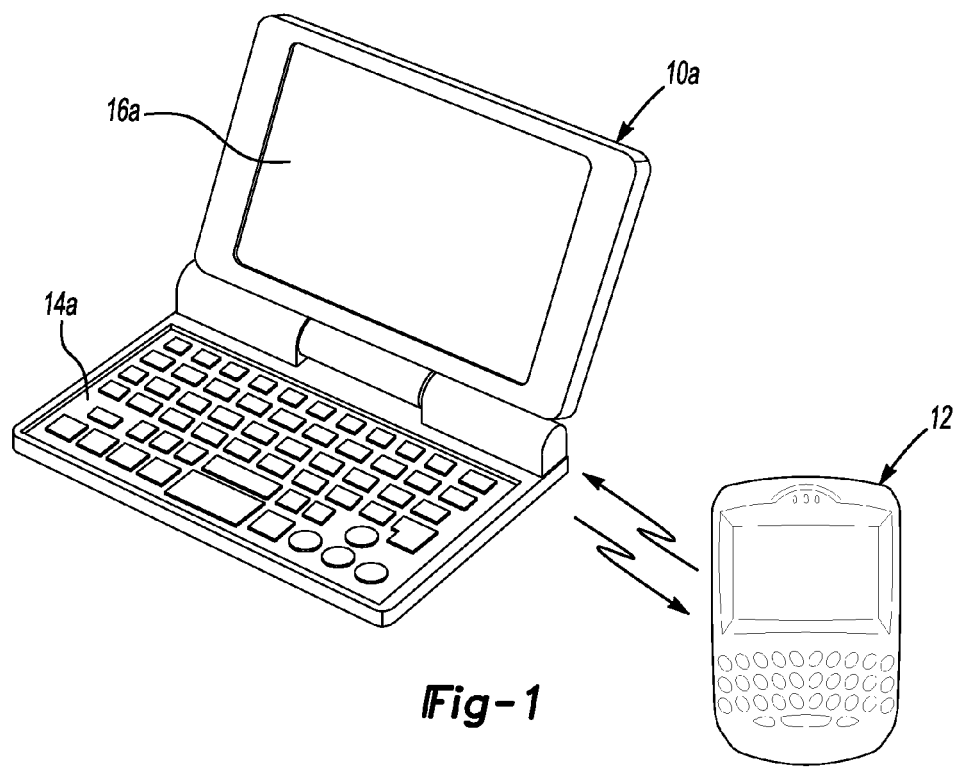
FIG. 1 illustrates a mobile device communicating with a laptop computing device using the interface of the present invention.

Referring to FIG. 1, a PC 10*a* includes a keyboard 14*a* and a display 16*a* that are much larger than those of a mobile device 12. The PC 10*a* is a general purpose computer with a processor, memory, storage (such as hard drive or other electronic, optical, magnetic or other mass storage). The PC 10*a* also typically has a more powerful processor and more memory and storage. Although a laptop or notebook computer is shown, the PC 10*a* could also be a desktop computer.

The mobile device 12 is a "smartphone" or at least a PDA with wireless connectivity. In this context, "mobile device" means a mobile device having at least a processor, local storage, local wireless connectivity (e.g. Bluetooth or similar) and wireless data connectivity via cell towers or satellite or some other wide area network. The mobile device 12 may also provide voice wireless connectivity (i.e. telephone functions) and may also include a display and user input device (such as telephone keys or a mini-keyboard or on-screen soft keys).

In the present invention, software is installed on the PC 10*a* and the mobile device 12 to communicate wirelessly (Bluetooth, WiFi, or other suitable protocol, preferably secure) with one another. Alternatively, or optionally, they can be connected via a wire, such as a USB cable, for increased speed and security. The mobile device software will connect with the PC software to provide the PC 10*a* real-time access to information on mobile device 12. It will also monitor mobile device activities and will alert the PC software of new email messages arriving on the mobile device 12, calendar events, sms, phone calls with (caller id), etc. The PC 10*a* software will provide a user interface to mobile device 12 contents and alerts through a user-friendly interface residing on the PC 10*a*. The user will be able to see a real-time image of mobile device 12 information content, including, emails: sent, received, sms, phone calls, etc.

For example, new emails arriving on mobile device 12 will show immediately on PC 10*a* software interface. The user can open the new emails using the PC 10*a*, along with previously-received emails that exist on the mobile device 12. The user can also open any attachments using PC 10 resident software (Microsoft Office, PowerPoint, Word, Acrobat, etc) to open and manipulate attachments. The user can respond to emails using the PC 10*a* and can attach documents from the PC 10*a*. The outcome of all activities are mirrored and executed in real-time on the mobile device 12 and as such the mobile device 12 will execute the responses as if it they were initiated on the mobile device 12. For instance, as soon as a new email arrives at the mobile device 12, a copy of the email is immediately presented on the PC 10*a* software. The user can open the email and attachments (if any), and reply to the email using the larger display and keyboard on the PC 10*a*, rather than the mobile device 12.

The PC 10*a* software will communicate the response of the user to the mobile device 12. The mobile device 12 in turn will send the response as if it was initiated from within the mobile device 12 using its wireless module, and logs it in its mailbox activities as a sent reply. Similarly, the user can initiate on the PC 10*a* software a new message to a recipient (new contact or a contact from the mobile device 12 contact list). The user can use PC 10*a* resident software applications to compose the message, and or attachments, and press send. The send command will cause the message to be communicated to the mobile device 12 which will send the email and log the message as a sent message on its mailbox file structure.

The user can also use the PC software to compose an sms message (or similar message format) to a person on the contact list and can also respond to sms messages. When a new call arrives on mobile device 12, the caller id is displayed on the display 16*a* of the PC 10*a*. The user can execute mobile device resident web browsers and use the larger display 16*a* for browsing the web.

With this invention, the PC 10*a* does not need to have internet connectivity or wifi connectivity to the internet. It just needs to have a wireless or a wired connection to the mobile device 12. The user can enjoy the mobile device 12 wireless connectivity and at the same time take advantage of the larger PC display 16*a*, keyboard 14*a*, and PC-resident software apps, without the need to pay for another wireless service for his/her PC 10*a*.

In a first mode of operation, the information on the mobile device 12 (contacts, calendar, emails, media files such as mp3s, mpegs, etc) is sent to the PC 10*a* as requested by the PC 10*a* for review by the user on the display 16*a* and/or modification with the keyboard 14*a* (and/or mouse or other user input devices). For example, the mobile device 12 sends a list of emails in the user's inbox when so requested by the PC 10*a*, and only after one of the emails has been selected by the user (via the user input devices on the PC 10*a*) is that email sent to the PC 10*a*. However, as the email is modified or forwarded or replied to by the user on the PC 10*a*, the modified email (or forward or reply) is transmitted to the mobile device 12 and is actually sent from the relevant program in the mobile device 12, such that for all intents, purposes and outward appearances, the email was sent by the mobile device 12.

In a second mode of operation, the PC 10*a* acts only as a "dumb" terminal for the mobile device 12. The PC 10*a* receives information to display on display 16*a* from mobile device 12, and the PC 10*a* sends user inputs from the keyboard 14*a* (or other user input devices) directly to the mobile device 12 to be processed by the processor of the mobile device 12. In this mode, the user's information is more secure, since none of it is stored on the PC 10*a*; however, the user does not gain the advantage of the increased processing power of the PC 10*a*. This would be appropriate when using a public PC 10*a* or someone else's PC 10*a*.

Preferably, the user can choose the first mode or the second mode with the mobile device 12, as appropriate in a given situation. When working on his own PC 10*a*, he can work in the first mode for increased power and speed, and when working on a PC 10*a* that is not his own he can work in the second mode for security (while still enjoying the improved interface with the larger display 16*a* and keyboard 14*a* or other user input devices).

In either mode, the access to the data on the mobile device 12 is in real-time. There is no need to wait for the devices to synchronize.

Figure 2:
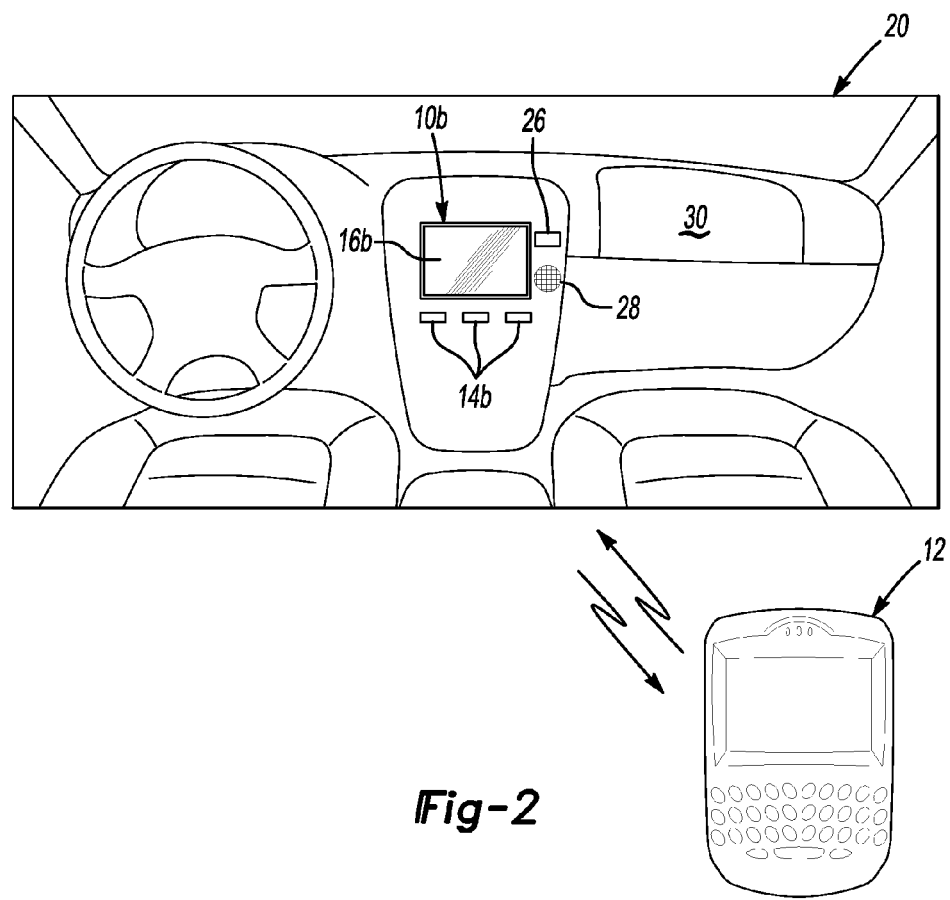
FIG. 2 illustrates the mobile device communicating with an in-vehicle computing system using the interface of the present invention.

As shown in FIG. 2, the invention could also be implemented in a vehicle 20. The in-vehicle system 10*b* includes a display 16*b* (such as a touch-screen display), user input devices 14*b* (such as button, joysticks, etc). The in-vehicle system 10*b* may also include a microphone 26 and speaker 28 so that user speech recognition, user voice commands and speech feedback from the system 10*b* can be provided. In this manner, the user can access and control the mobile device 12 with the system 10*b* in the vehicle 20. The user can control the mobile device 12 with the user input devices 14*b* and view data from the mobile device 12 on the display 16*b* in a manner similar to that described above with respect to FIG. 1. Additionally, the user can give voice commands, which are processed by the system 10*b* and converted to commands to be sent to the mobile device 12. The user can further dictate emails or text messages to be sent by the mobile device 12 using the voice recognition of the system 10*b*. Additionally, the information from the mobile device 12 can be converted from text to speech and read to the user by the system 10*b* via the speaker 28. The system 10*b* can also be operated in either the first or second modes described above.

Figure 3:
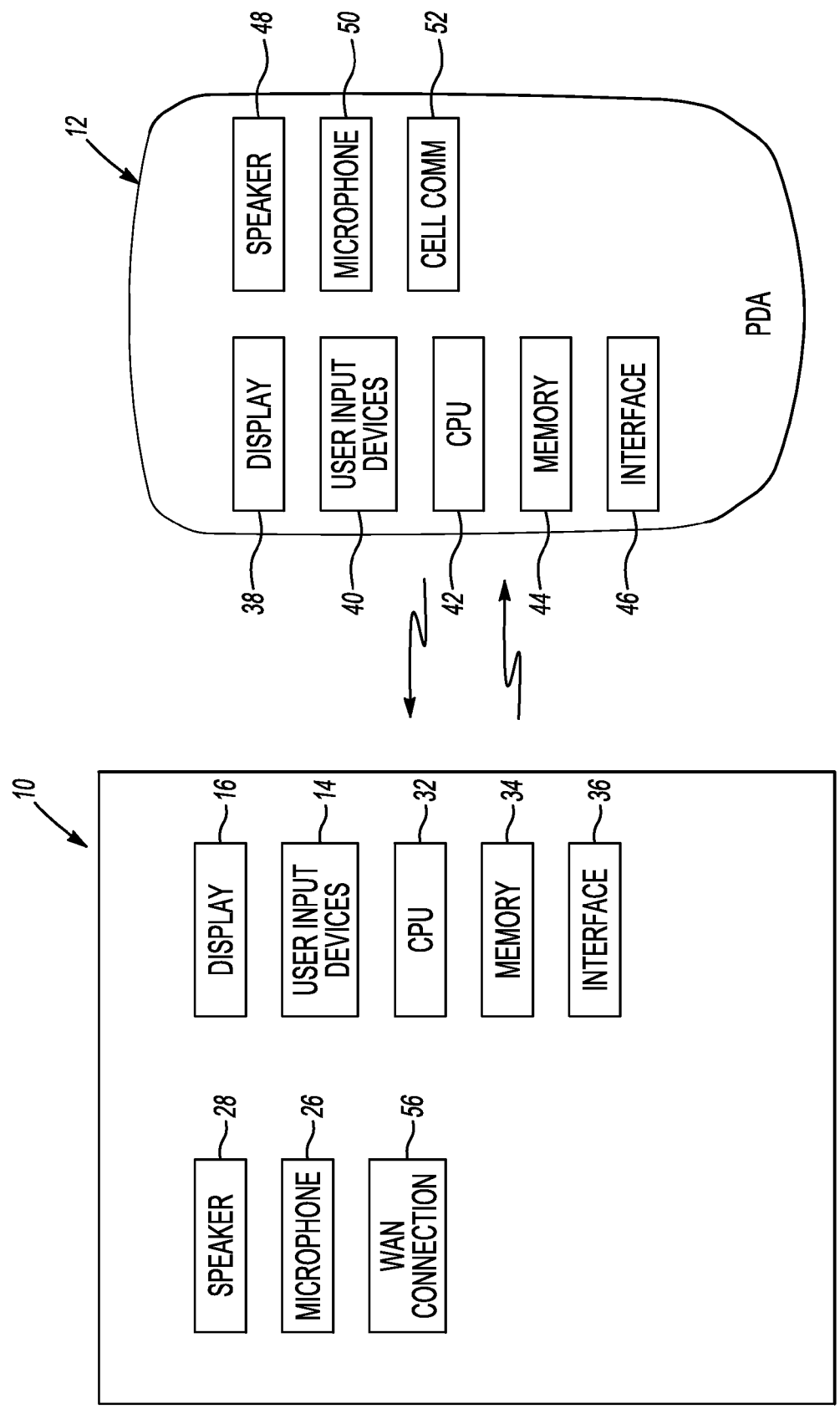
FIG. 3 is a schematic of the interface of FIGS. 1 and 2.

FIG. 3 schematically illustrates the components of the mobile device 12 and computing device 10 (generically referring to PC 10*a* or in-vehicle system 10*b*). The computing device 10 includes at least several of following components: the display 16, user input devices 14, speaker 28 and microphone 26 (the PC 10*a* could also include the speaker 28 and microphone 26, as they usually do, and could also include the speech recognition and text to speech capabilities described above). The computing device 10 includes a CPU 32, memory 34 and an interface 36 (such as a Bluetooth communication circuit and/or USB connector). The memory 34 stores computer instructions which when executed by the CPU 32 performs the functions described herein.

The mobile device 12 may include a display 38 and user input devices 40 (keys or keyboard, touchscreen, scroll wheels, etc). The mobile device 12 includes a CPU 42, memory 44 and interface 46 complementary to the interface 36 on the computing device 10. The mobile device 12 may include a speaker 48 and microphone 50 (such as for telephone applications) and includes a cellular communication circuit 52 (or satellite or other) for at least data transmission and preferably voice transmission. Contacts, calendar, tasks, email, media (music, video, books, audio, etc) are stored in memory 44. The memory 44 stores computer instructions which when executed by the CPU 42 performs the functions described herein.

In the first mode, software in memory 34 of the computing device 10 retrieves information from the memory 44 of the mobile device 12, stores it in memory 34 of computing device 10, from which it is displayed on the display 16 (and/or read or played over speaker 28) and can be modified with user input devices 14 (or microphone 26). The modified information may be sent back to the mobile device 12 for storage in memory 44 and/or retransmission (such as an email or meeting request, etc) by the mobile device 12.

In the second mode of operation, the computing device 10 acts only as a "dumb" terminal for the mobile device 12 via the interface 36. The computing device 10 receives information to display on display 16 (or read or play over speaker 28) from mobile device 12, and the computing device 10 sends user inputs from the keyboard 14 (or other user input devices) or converted speech commands directly to the mobile device 12 to be processed by the processor 42 of the mobile device 12. The processor 42 of the mobile device 12 acts on the information stored in its memory 44. In this mode, the user's information is more secure, since none of it is stored on the computing device 10; however, the user does not gain the advantage of the increased processing power of the computing device 10. This would be appropriate when using a public computing device 10 or someone else's computing device 10.

In either mode, the computing device 10 can also access telephone functions of the mobile device 12 (for mobile devices 12 with telephone functionality). For example, using the computing device 10, the user can access contacts stored in the mobile device 12 and choose a phone number, which is then dialed by the mobile device 12. The user can use the microphone 26 and speaker 28 of the computing device 10 to converse on the telephone call. Also, the mobile device 12 informs the computing device 10 of incoming telephone calls (with caller id information displayed on display 16 or read via speaker 28), incoming email or sms or text messages, etc.

The mobile device 12 can also make use of an internet connection 56 of the computing device 10, if the computing device internet connection is faster than that of the mobile device 12.

Figure 4:
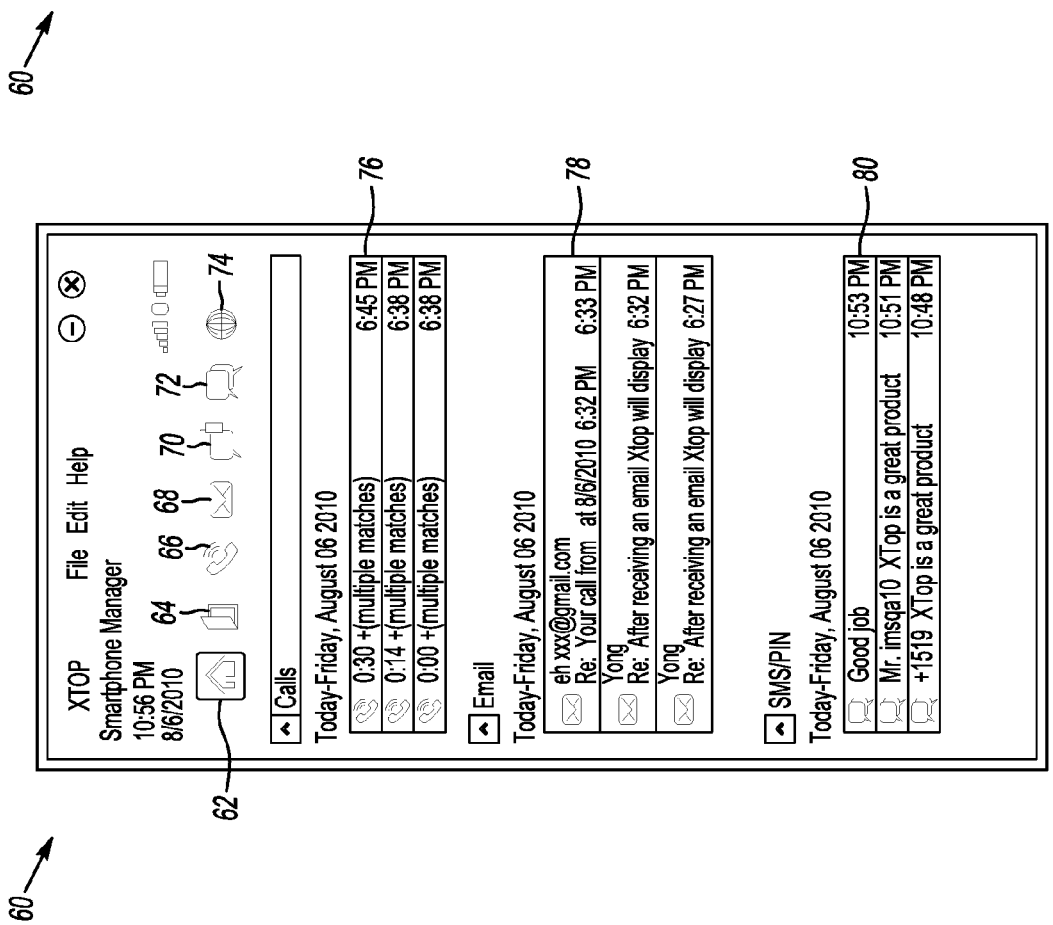
FIG. 4 is a home screen that is shown on the display of FIG. 1 or 2 in operation.

FIG. 4 is a home screen 60 that is shown on the display 16*a,b* of FIG. 1 or 2 in operation. The home screen 60 includes a plurality of icons for selecting different screens, including home 62, contacts 64, phone 66, email 68, text 70, PIN 72 and web 74. The home screen 60 displays a calls field 76, an email field 78 and an SMS/PIN field 80 each listing recent activity of calls, email and text, respectively.

Figure 5:
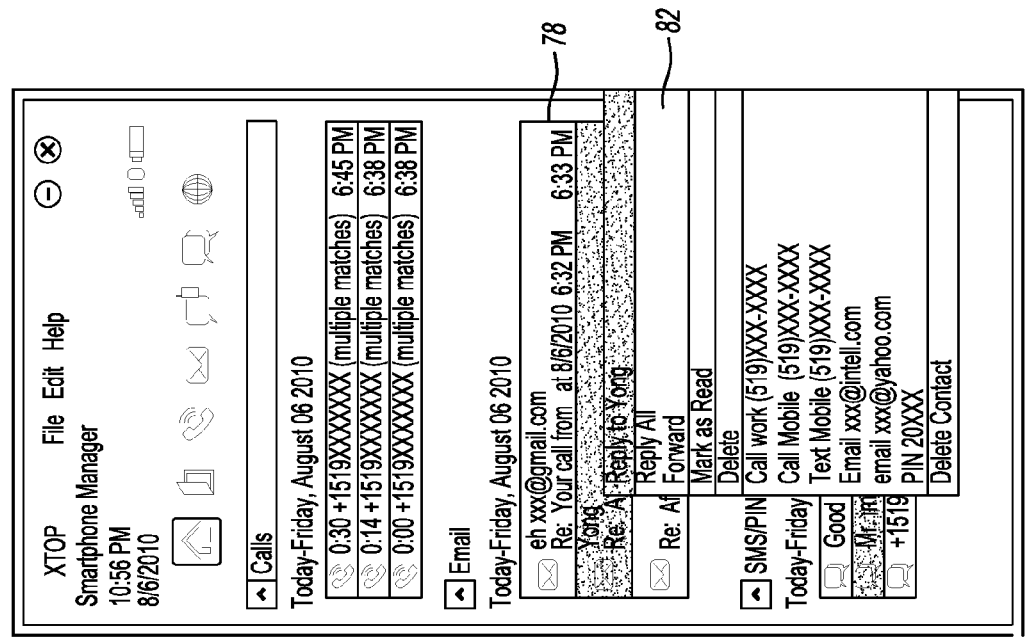
FIG. 5 is shows the home screen in use with an email right-click menu.

FIG. 5 is shows the home screen 60 in use with an email right-click menu 82. When the user right-clicks on an email in the email field 78, the email right-click menu 82 appears as shown. The email right-click menu 82 gives the user the option to choose standard email functions, such as reply, reply all, forward, mark as read and delete, but also provides multi-modal functions, such as calling or texting the sender. The sender's contact in the user's address book is accessed and the sender's phone numbers, multiple email addresses and PIN are provided as communication options. Thus, the user can respond to an email with an email to the sender's reply email address or a different email address of the sender. The user can respond to the email with a telephone call or text message (as applicable) to any of the sender's associated telephone numbers.

FIG. 6 shows the home screen 60 of FIG. 5 with a phone right-click menu 84. When the user right clicks on a call in the calls field 76, the phone right-click menu 84 appears providing the options of responding to the call with a call or text to any of the sender's telephone numbers, or an email to any of the sender's email addresses.

FIG. 7 shows a contact screen 86 which is displayed when the user selects the contacts 64 icon. When the user right-clicks on one of the contacts, the contact right-click menu 88 appears, giving the user the options of calling, texting or emailing the contact from the contacts associated information.

Figure 8:
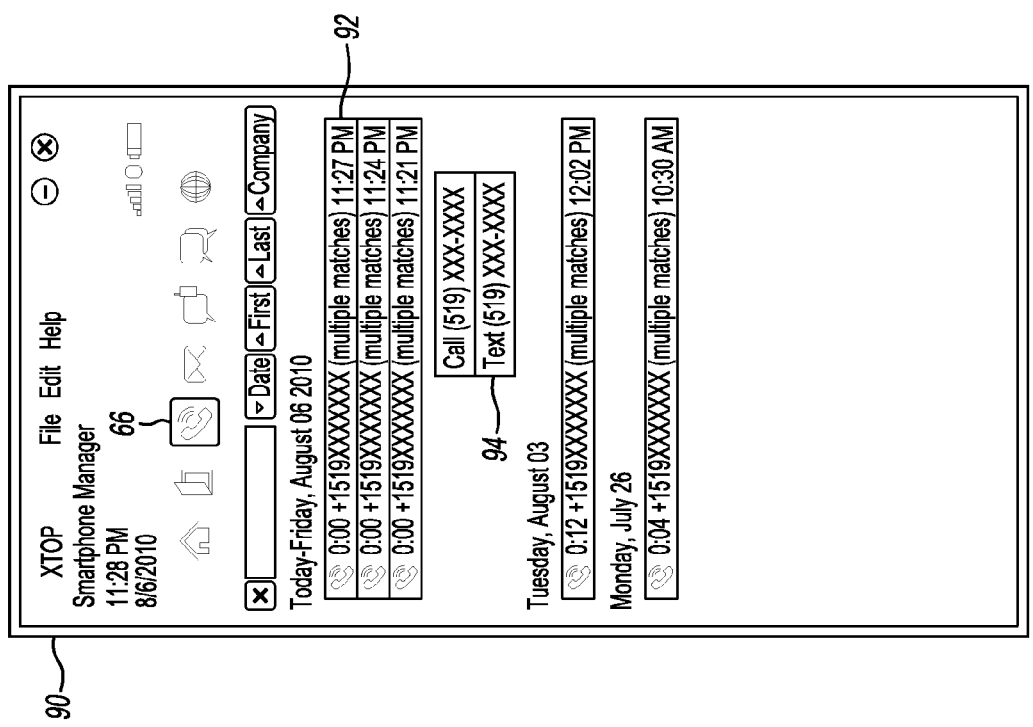
FIG. 8 shows a phone screen and right-click menu.

FIG. 8 shows a phone screen 90 which displays a call log by day. When the user right clicks on a call, the phone right-click menu 94 appears, giving the user the option of calling or texting (as applicable) the number of the caller. The complete log can be exported to a spreadsheet (for example), indicating the telephone number, time and duration of each call (and optionally, call notes).

Figure 9:
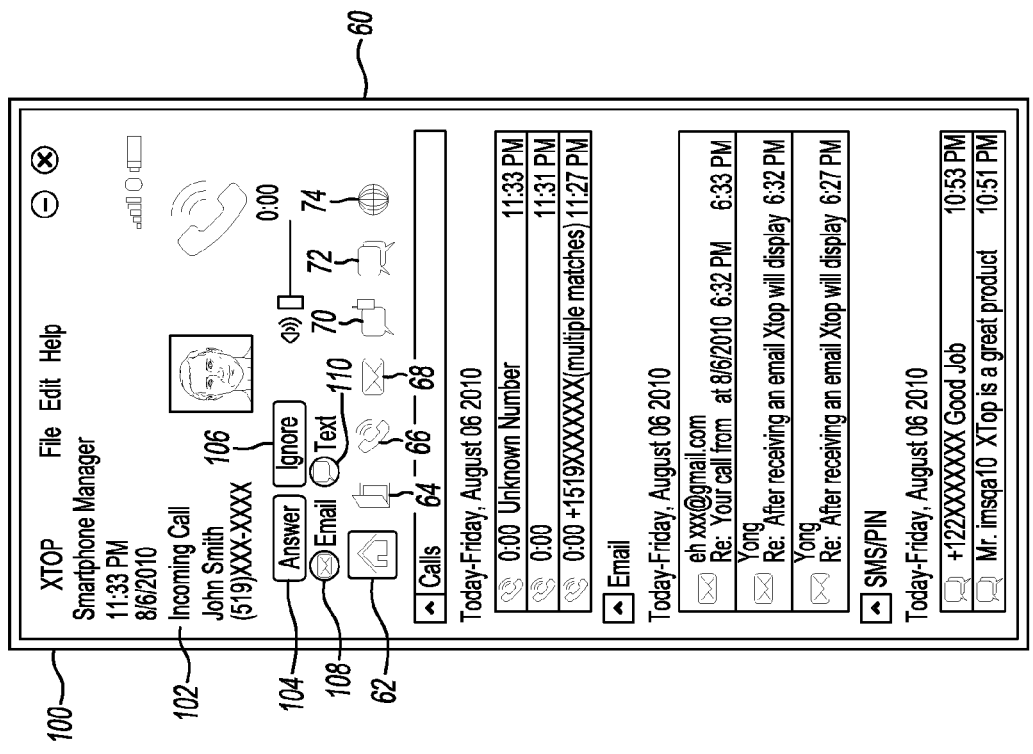
FIG. 9 shows the home screen during an incoming call.

FIG. 9 shows the home screen 60, during an incoming call. During an incoming call, an incoming call area 100 appears above the icons 62, 64, 66, 68, 70, 72, 74. The incoming call area 100 displays caller id information (which may include a photo from the caller's contact) in a caller id field 102, as well as multiple options for the user to respond to the incoming call. The incoming call area provides icons for answer 104 and ignore 106, to permit the user to answer the call or ignore the call, respectively. If the user answers the call by selecting answer 104, he can either speak and listen on the mobile device 12 or use a microphone and speakers associated with the computing device 10. While speaking, the user is provided an open field on the screen in which to type call notes. The call notes are associated with the call in the call log for later retrieval.

The user is also provided the option to email 108 or text 110 the caller. If the user selects email 108, the call is ignored and a new email is created, which is addressed to the email address of the caller as determined from the user's contacts, if available. If the user selects text 110, the call is ignored and a new text message is created, which is addressed to the phone number of the caller (or an alternate number of the caller, if the caller is in the user's contacts). In this manner, the user receives a call at an inopportune time (e.g. during a meeting), the user can quickly respond to the caller with a silent email or text message. When the call is ignored in favor of a non-voice message (email, text, etc), the caller may hear an outgoing message different from a normal voicemail outgoing message that indicates that the user cannot currently accept the call, and optionally, that the user will send an email or text message to the caller.

The email screen, text screen and PIN screen, selected by selecting the email 68, text 70 and PIN 72 icons, respectively provide full screens with the functionality explained with regard to the email field 78 and SMS/PIN field 80 in FIG. 4.

When the web 74 icon is selected, the user can use a web browser on the mobile device 12, but displayed on the computing device 10. Because the web browser runs on the mobile device 12, this provides the user with the more pleasant browsing capabilities of the computing device 10 (larger display, full keyboard, mouse/trackpad) using the data connection of the mobile device 12, but without "tethering," which may incur additional charges from the mobile device 12 service provider.

As indicated, the mobile device 12 and computing device 10 may use Bluetooth (or similar) for communication and this may be the default connection between the two devices. Alternatively, or as an option, the Bluetooth may be used primarily for proximity detection between the two devices, which then may automatically use higher bandwidth connection (e.g. WiFi, either directly between devices or over a local network) for data transfer when available.

In the examples herein where contact information is used, the software on the computing device 10 automatically merges contact entries for the same person. The information may be permanently combined or may be temporarily "combined" solely to provide the pop-up menu options described herein. This may include multiple contact entries on the mobile device 12 or duplicate contact entries stored on the mobile device 12 and computing device 10.

After a mobile device 12 has been connected to a computing device 10, the computing device 10 identification can be saved, such that the software provides automatic device detection, reconnection (with a notification only), and subsequent disconnection when there is no longer proximity. Multiple mobile devices 12 can be authorized to connect to a computing device 10 and multiple computing devices 10 can be authorized to connect to a mobile device 12, so that the user can simply move the mobile device 12 among their home computer, work computer, laptop, in-vehicle device, etc. As a user-configurable option, if the connection is temporarily lost (e.g. out of range), the screen on the computing device 10 is automatically locked and automatically unlocks when proximity is restored. If the proximity is not restored within a certain time (e.g. one minute), the program on the computing device 10 is terminated, but can be restarted when proximity is restored. Once paired, will automatically connect whenever it comes in range of the PC 10 (if the user authorizes the PC 10, which the user would not do with a public computer or a borrowed computer) and disconnect when out of range.

Although one of the benefits of this system is that no information from the mobile device 12 is normally stored on the computing device 10, the user can choose a secure computing device 10 (e.g. home desktop or work desktop) that can perform automatic backups of all information on the mobile device 12 over the connection between the two whenever they are connected. If the user gets a new mobile device 12, the user can perform a simple restore of all the information from the secure computing device 10 to the new mobile device 12, thus restoring contacts, emails, preferences, etc. The backups may also include a version history, in case the user accidentally deletes a wanted email or contact from the mobile device 12. A wired (e.g. USB) connection between the mobile device 12 and computing device 10 may be desirable for faster backups and restores.

The software may choose network transport for communications according to certain rules taking into account a balance of cost and security.

The software may also track cost, such as the cost of phone calls (including call length), emails (data usage), text messages, etc. The software may suggest alternative transport based upon cost (e.g. SMS cheaper than MMS, RIM messenger is free).

The system can be used to provide presentations, such as PowerPoint presentations. When a presentation is being given (in presentation mode), the system automatically suppresses all notifications until the end of the presentation.

Message and contacts can be dragged & dropped (moved or copied) between the mobile device 12 and the computing device 10.

The software may provide direct integration with personal information manager (PIM) software on the computing device 10, such as Outlook. The mobile device 12 appears as another message store and provider in the PIM software. mobile device 12 contents appear as a standard message store (with mail/SMS/voice folders, contacts, calendar) with full drag-and-drop support between folders on the mobile device 12 and between the mobile device 12 and computing device 10.

When out of wireless coverage, long messages are cached on the mobile device 12 and delivered as soon as coverage is restored. This seamless process ensures messages are delivered in a timely fashion even after the computing device 10 is powered down (in the case of a laptop, for example).

All work can be maintained on the mobile device 12, allowing one computing device 10 to be shut down and another computing device 10 can then connect to the mobile device 12 and continue from exactly where it left off.

In accordance with the provisions of the patent statutes and jurisprudence, exemplary configurations described above are considered to represent a preferred embodiment of the invention. However, it should be noted that the invention can be practiced otherwise than as specifically illustrated and described without departing from its spirit or scope.

What is claimed is:

1. A method of handling a voice call including the steps of:
    a) receiving an incoming voice call;
    b) notifying a user of the incoming voice call;
    c) receiving an indication from the user to respond to the incoming voice call with a non-voice message;
    d) accessing a contact list in response to said step c);
    e) retrieving a contact entry associated with the caller in the incoming voice call in response to said step c); and
    f) creating a non-voice message to the caller based upon the contact entry.

2. The method of claim 1 further including the step of ignoring the incoming voice call based upon said step c).

3. The method of claim 1 wherein the non-voice message is an email or a text message.

4. The method of claim 1 wherein said step c) is performed on a computing device independent of a mobile device on which the incoming voice call is being received.

5. The method of claim 4 further including the steps of:
    establishing a connection between the computing device and the mobile device;
    accessing information on the mobile device with the computing device; and
    controlling operation of the mobile device with the computing device.

6. The method of claim 4 wherein said step c) includes receiving the indication from the user from a user input device on the computing device.

7. A method of handling a non-voice message including the steps of:
    a) receiving a non-voice message;
    b) listing the message on a display;
    c) receiving a selection of the message from the list;
    d) accessing a contact list in response to said step c);
    e) retrieving a contact entry associated with the sender of the message in response to said step c); and
    f) initiating a new communication to the sender in a different mode from that in which the message was sent based upon the contact entry.

8. The method of claim 7 further including the steps of retrieving a phone number from the contact entry in said step e) and calling the phone number in said step f).

9. The method of claim 7 wherein the non-voice message is an email or a text message.

10. The method of claim 7 wherein said step c) is performed on a computing device independent of a mobile device on which the message is received in said step a).

11. The method of claim 10 wherein said step c) includes receiving the selection from the user from a user input device on the computing device.

12. The method of claim 10 further including the steps of:
    establishing a connection between the computing device and the mobile device;
    accessing information on the mobile device with the computing device; and
    controlling operation of the mobile device with the computing device.

13. The method of claim 12 wherein the mobile device and computing device detect proximity of one another via one wireless protocol, but establish the connection between them via a different wireless protocol.

14. The method of claim 13 wherein the mobile device and computing device detect proximity of one another via a first wireless protocol and establish the connection via a second wireless protocol.

15. The method of claim 12 further including the step of providing a backup of information on the mobile device to the computing device.

* * * * *